Patented Nov. 24, 1936

2,061,627

UNITED STATES PATENT OFFICE 2,061,627

MANUFACTURE OF NITRONAPHTHYL-AMINES

Herbert Henry Hodgson, Huddersfield, England, assignor to Imperial Chemical Industries Limited, a corporation of Great Britain No Drawing. Application May 7, 1935, Serial No. 20,297. In Great Britain May 11, 1934

2 Claims. (Cl. 260—130.5)

This invention relates to a process for making 4, 5, and 8-nitro-alpha-naphthylamines.

8-nitro-naphthylamine and 5-nitro-naphthylamine have been of considerable interest as intermediates in the manufacture of azo dyes, but their use has been restricted because heretofore no technically and economically satisfactory method of making them has been invented.

It is an object of this invention to produce 4, 5, and 8-nitro-naphthylamines by an improved process which is both technically and economically satisfactory. Other objects of the invention will be in part apparent and in part hereinafter more fully set forth.

The objects of the invention are attained, generally speaking, by nitrating an alpha-naphthylphthalimide and by hydrolyzing the resulting nitro-naphthylphthalimides. My invention also comprises means of segregating the various nitro-alpha-naphthylamines.

The invention is illustrated but not limited by the following example in which the parts are by weight.

Example I 273 parts of dry alpha-naphthylphthalimide were gradually added to 450 parts of nitric acid (sp. gr. 1.45) at a temperature below 15° C., the mixture was stirred for about an hour after all the solid has been added, the mixture was poured into water, the precipitated nitro-naphthylphthalimides were filtered off and washed, and were hydrolyzed by heating in an autoclave for about one hour at about 120° C. with 720 parts of concentrated aqueous ammonia (sp. gr. 0.9), the crude mixture containing nitro-naphthylamines was freed from a small amount of tarry material by dissolving it in 1800 parts of nitrobenzene, filtering and passing dry hydrogen chloride through the filtrate until precipitation stopped. The nitro-naphthylamines were precipitated as a mixture of hydrochlorides, and were filtered off and washed with a low boiling solvent such as benzene. The yield of mixed hydrochlorides so obtained was 81% of theory, and consisted of about 60% of 8-nitro-alpha-naphthylamine, about 30% of 5-nitro-alpha-naphthylamine and a small amount of 4-nitro-alpha-naphthylamine, which were separated from each other as follows:—20 parts of the mixed hydrochlorides were basified by treatment with sodium hydroxide solution or dilute ammonia, and were stirred into 2000 parts of 10% aqueous sulfuric acid at 95° C. The mixture was cooled, and filtered. The precipitate consisted of 5-nitro-alpha-naphthylamine sulfate mixed with a small quantity of 4-nitro-alpha-naphthylamine sulfate. The filtrate contained 10 parts of 8-nitro-alpha-naphthylamine, which was separated by basifying the solution with ammonia, washing and drying. The crude 8-nitro-alpha-naphthylamine melts at 70–80° C, and on recrystallization from ligroin melts at 97° C. The precipitate from the first filtering was again basified with ammonia, washed, pressed, and treated with 2200 parts of warm aqueous hydrochloric acid containing 72 parts hydrochloric acid. 0.9 parts of 4-nitro-alpha-naphthylamine remained undissolved, and, after cooling, were filtered off, washed, and dried. From the filtrate 4.7 parts of 5-nitro-alpha-naphthylamine were precipitated by adding ammonia.

The examples in the following table further illustrate the invention as applied to alpha-naphthylphthalimides carrying substituents on the phthalic acid residue. The table shows the amount of nitric acid used for the nitration of 300 parts of different alpha-naphthylphthalimides, the yield of mixed nitro-naphthylamine hydrochlorides and the yield of 8-nitro and 5-nitro-naphthylamines obtained when using the general procedure described in Example I.

| Examples | Parts nitric acid (sp. gr. 1.45) | Parts mixed hydrochloride | Parts of 8-nitro-naphthylamine | Parts of 5-nitro-naphthylamine |
|---|---|---|---|---|
| II. Alpha - naphthyl - 4 - chlorophthalimide | 705 | 195 | 21 | 119 |
| III. Alpha - naphthyl - 3:4 - dichlorophthalimide | 1,200 | 160 | 29 | 80 |
| IV. Alpha - naphthyl - 3:6 - dichlorophthalimide | 1,200 | 168 | 25 | 114 |
| V. Alpha - naphthyl - 3 - nitrophthalimide | 600 | 154 | 17 | 89 |
| VI. Alpha - naphthyl - 4 - nitrophthalimide | 600 | 176 | 21 | 111 |

The alpha-naphthylphthalimides used in the above examples may be conveniently prepared as follows:—

300 parts of tetrachloroethane are heated to boiling point with one molecular proportion of phthalic acid or anhydride (or the substituted compounds e. g. 4-chlorophthalic acid). One molecular proportion of alpha-napthylamine is then added and the mixture is boiled under reflux until the reaction, which proceeds with the splitting off of water, is complete (approximately one-half to one hour). Alpha-naphthylphthalimide (or the corresponding substituted compound) crystallizes from the reaction mixture on cooling. The yield is approximately 90% of theory. If desired the alpha-naphthylphthalimides may be purified by recrystallization from glacial acetic acid.

An advantage of the invention is the production of new intermediates by an economically and tenchnically satisfactory process. Another advantage of the invention is in the production of new intermediate products which can be hydrolated and which can be used as starting points for the final product. Other advantages will be in part apparent to persons skilled in the making of dyes.

As many apparently widely different embodimets of this invention may be made without departing from the spirit and scope thereof, it is to be understood that I do not limit myself to the specific embodiments thereof except as defined in the appended claims.

I claim:

1. The method of making a nitro-alpha-naphthylamine which comprises adding alpha-naphthylphthalimides gradually to a bath containing nitric acid at a temperature below 15° C., stirring for about an hour, watering, filtering off the precipitated nitro-naphthylphthalimides, heating them with concentrated aqueous ammonia in an autoclave for about one hour at about 120° C., purifying the precipitate, and separating various nitro-naphthylamines by forming the hydrochlorides, treating them with a base, mixing with sulfuric acid, filtering off the mixed 5 and 4 nitro-alpha-naphthylamines, basifying the precipitate, treating with water and hydrochloric acid, filtering off the 4-nitro-alpha-naphthylamine, precipitating and separating the 5-nitro-alpha-naphthylamine, basifying the filtrate containing the 8-nitro-alpha-naphthylamine and washing and drying the precipitate.

2. The method of making a nitro-alpha-naphthylamine which comprises nitrating an alpha-naphthylphthalimide and hydrolyzing the resulting nitro-naphthylphthalimides.

HERBERT HENRY HODGSON.